United States Patent [19]

Angilella et al.

[11] 3,770,286
[45] Nov. 6, 1973

[54] PISTON RING
[75] Inventors: Anthony G. Angilella, Centerville; William P. Wallace, Hagerstown, both of Ind.
[73] Assignee: Dana Corporation, Toledo, Ohio
[22] Filed: Mar. 11, 1971
[21] Appl. No.: 123,316

[52] U.S. Cl. ............................... 277/235 A, 204/41
[51] Int. Cl. ........................... F16j 15/00, C23b 5/06
[58] Field of Search ................... 277/235 A; 156/2; 29/196.6; 204/41, 23, 25

[56] References Cited
UNITED STATES PATENTS

| 3,573,874 | 4/1971 | Hill et al. | 277/231 |
| 3,418,220 | 12/1968 | Roggendorf | 204/41 |
| 2,873,154 | 2/1959 | Marker | 277/235 A |
| 2,589,107 | 3/1952 | Marien | 277/235 A |

FOREIGN PATENTS OR APPLICATIONS

| 462,725 | 1/1950 | Canada | 204/23 |
| 632,986 | 12/1949 | Great Britain | 277/235 A |
| 844,718 | 8/1960 | Great Britain | 277/235 A |

Primary Examiner—Samuel B. Rothberg
Attorney—John F. Teigland, Walter E. Pavlick and Harold D. Shall

[57] ABSTRACT

Disclosed herein is a piston ring having an improved bearing surface and method of making the same wherein a first layer of hard chromium is electrodeposited on the bearing surface of a piston ring blank, a second layer of microcracked chromium is deposited on the first layer and the second layer of microcracked chromium is etched to provide a finely porous, friable surface, to eliminate the need for lapping of the ring and to promote break-in.

8 Claims, 5 Drawing Figures

PATENTED NOV 6 1973 3,770,286

INVENTORS
WILLIAM P. WALLACE
ANTHONY G. ANGILELLA

BY John F. Jeigland
ATTORNEY

PISTON RING

BACKGROUND OF THE INVENTION

This invention relates generally to piston rings for internal combustion engines and more particularly to a piston ring having an improved bearing surface and a method of forming the same.

Plating the bearing surface of a piston ring with hard chromium is known to offer several advantages. The hard chromium plate is wear resistant which improves the life of the piston ring. Hard chromium plate is also corrosion resistant and has a low co-efficient of friction, both desirable properties. Further, hard chromium plate is scuff resistant, that is, it resists localized welding with the cylinder wall at elevated temperatures.

For all of the above advantages, hard chromium plate has several disadvantages. For economic reasons, it is necessary to deposit the hard chromium at relatively high deposition rates which results in large nodules and a coarse grain structure. To prevent initial scoring of the cylinder wall and to provide a uniform surface it is necessary to lap the bearing surface of the ring to remove or wear down the nodules that are formed during plating and to remove other surface irregularities resulting from plating over an imperfect substrate. The required one or more lapping operations are necessarily expensive.

A second disadvantage of hard chromium plate rings is the long break-in period that is required, since even when hard chromium plated rings are lapped they do not perfectly conform to the cylinder wall. Accordingly, a wear-in or break-in period is required to seat the ring. Because of the wear resistant properties of hard chromium plate an extended break-in period is required before the engine operates at peak performance. As is commonly known during this break-in period the engine must be run at reduced speeds and reduced loads.

The above mentioned disadvantages of hard chromium plated piston rings are well known and numerous attempts have been made to overcome them. One proposal has been to overplate the hard chromium with a second layer of relatively soft material which is not resistant to wear. This has not been successful because either it wears away too rapidly or is subject to scuffing. A second proposal has been to etch the hard chromium to make its surface less wear resistant. This approach has not been successful because of the coarse grain structure and large nodules that become exposed resulting in much the same type of surface condition that existed prior to etching.

SUMMARY OF THE INVENTION

The invention disclosed herein provides a piston ring having an improved bearing surface and method of forming the same which includes electrodepositing a first layer of hard chromium on the bearing surface of a conventional piston ring blank, electrodepositing a substantially thinner second layer of microcracked chromium on the first layer and electrochemically etching the surface of the second layer to provide a finely porous and friable structure, which, while having many of the properties of hard chromium, eliminates the need for lapping and which permits early break-in of the unlapped ring. Because of its finely porous surface, the second layer is oil wetable. The piston ring is thereby lubricated, particularly during the break-in period, which increases initial scuff resistance. Etching the fine microcracked structure produces a surface that is friable and less wear resistant than ordinary hard chromium plate which permits the ring to wear-in, i.e. assume conformity with the cylinder wall, in a far shorter time than is ordinarily the case with hard chromium plate, thereby minimizing blow-by and reducing oil consumption.

Other objects and advantages of the invention will become apparent from the following detailed description and drawings in which.

Figure 1:
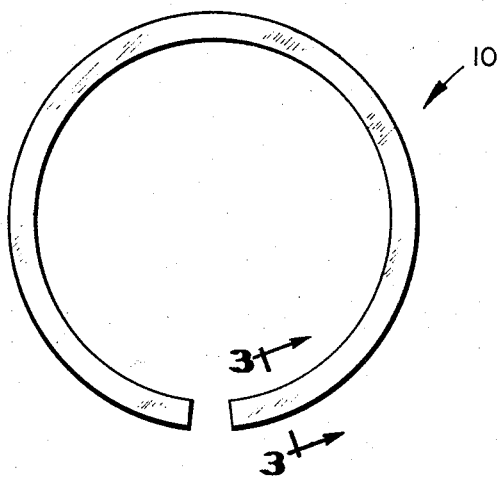
FIG. 1 is a plan view of the piston ring of this invention.
Figure 2:
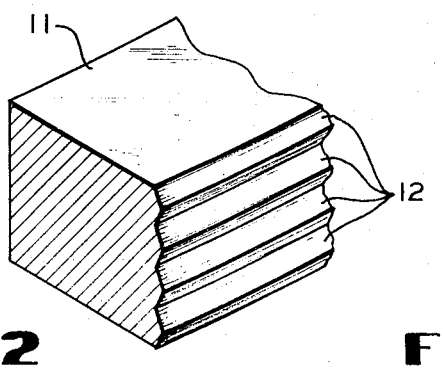
FIG. 2 is a partial perspective view showing a section of the piston ring blank prior to plating.

Referring to the drawings, the piston ring 10 of this invention is formed of a conventional metallic piston ring blank 11, which is a split annular member or ring. Any conventional piston ring material can be used including cast irons, steels and stainless steels. As shown particularly in FIG. 2, a series of axially spaced, annular grooves 12 are tool formed in the circumference or outer peripheral or bearing surface of the piston ring blank 11. The grooves 12 are shallow having a depth of about 0.003 inch and an included angle of 120°. Tool forming grooves on the bearing surface of a ring is conventional practice and can be omitted if desired. The bearing surface of the piston ring blank can be given any other conventional form, such as barrel face.

In commencing the plating operation, a number of rings are assembled in concentric relationship on a plating arbor and closed so as to expose only their respective bearing surfaces to the plating bath. A first layer 13 of hard chromium is electrodeposited on the outer peripheral surface of the assembled rings.

The first layer 13 of hard chromium can be applied by using conventional plating baths and procedures. Two examples of plating bath compositions (aqueous solutions) and operating parameters are the following:

| | |
|---|---|
| Chromic Acid | 17.2–74.5 oz./gal. |
| Sulfate | 0.26–0.58 oz./gal. |
| Bath Temperature | 90°–140°F. |
| Current Density | 3.0–5.0 a.s.i. |
| and | |
| Chromic Acid | 12–64 oz./gal. |
| Sulfate | 0.10–0.40 oz./gal. |
| Active Fluoride* | 0.50–2.65 oz./gal. |
| Bath Temperature | 90°–140°F. |
| Current Density | 3.0–5.0 a.s.i. |

(*The active fluoride described herein functions as a catalyst and may be omitted.)

The plating is continued for a sufficient length of time to obtain the desired thickness of the first layer which ranges from 0.0025 – 0.0060 inch. The hardness of the first layer will be in excess of 775 measured on the Vicker's scale ($VPN_{100}$). The crack density of the first layer is typically in the range of 1,200 – 2,200 cracks per inch.

After the first layer of hard chromium has been applied, the rings are transferred to a second plating bath, without rinsing, where they are allowed to soak before electrodepositing the second layer 14 of microcracked chromium plate.

Microcracked chromium plate is characterized by the presence of a large number of fine, intersecting, randomly arranged cracks with a crack density of at least 5,000 cracks per inch. The crack pattern is distinct and readily distinguishable from conventional chromium plate which has typically coarse or gross cracks with a crack density of less than 3,000 cracks per inch. Crack density is measured by counting the number of cracks which cut across a definite gage length (inch or centimeter).

The second layer 14 of microcracked chromium plate can be applied by several processes. The preferred method of applying the second layer is by electrodepositing it from an aqueous bath of the following composition and using the following operating parameters:

| | |
|---|---|
| Chromic Acid | 18.8–73.6 oz./gal. |
| Sulfate | 0.10–0.52 oz./gal. |
| Active Fluoride | 0.10–0.52 oz./gal. |
| Selenium* | 0.0003–0.0040 oz./gal. |
| Bath Temperature | 90°–140°F. |
| Current Density | 0.5–2.3 a.s.i. |

(*The selenium described herein is preferably in the form of sodium selenate.)

The plating current is gradually and slowly increased to the desired level, and maintained a sufficient length of time to obtain the desired thickness of the second layer 14 which ranges from 0.0002 to 0.0010 inch. The hardness of the second layer is in excess of 775 measured on the Vicker's scale ($VPN_{100}$). The crack density of the second layer is in excess of 5,000 cracks per inch.

Within the ranges set forth above the preferred bath composition and operating parameters are as follows:

| | |
|---|---|
| Chromic Acid | 20.0–55.0 oz./gal. |
| Sulfate | 0.11–0.20 oz./gal. |
| Active Fluoride | 0.20–0.40 oz./gal. |
| Selenium | 0.00065–0.0020 oz./gal. |
| Bath Temperature | 100°–130°F. |
| Current Density | 1.0–2.0 a.s.i. |

The crack density of a second layer electrodeposited in accordance with the above typically ranges from 6,200 to 7,100 cracks per inch or an average of 6,650 cracks per inch.

An alternative method of electrodepositing the first and second layers of hard conventional chromium and microcracked chromium respectively is to use a single aqueous plating bath of the following composition:

| | |
|---|---|
| Chromic Acid | 17.2–74.5 oz./gal. |
| Sulfate | 0.26–0.60 oz./gal. |
| Active Fluoride | 0.10–0.54 oz./gal. |
| Selenium | 0.0003–0.0040 oz./gal. |
| Bath Temperature | 90°–140°F. |

In this method, the first layer of hard chromium plate is deposited at a current density 3.0 – 5.0 a.s.i. (amperes per square inch) until a uniform thickness of 0.0025 – 0.0060 inch is obtained. Then the current density is reduced to the range of 0.5 – 2.3 a.s.i. and the second layer of microcracked chromium is plated until a uniform thickness of 0.0002 – 0.0010 inch is obtained. Each of the layers deposited by the above described method has a hardness in excess of 775 measured on the Vicker's scale ($VPN_{100}$). The crack density of the second layer is in excess of 5,000 cracks per inch. The crack density of the first layer is higher than in the first described method and will approach, but is less than, 3,000 cracks per inch.

Within the ranges for single bath method, the preferred bath composition and operating parameters are as follows:

| | |
|---|---|
| Chromium Acid | 30.0–50.0 oz./gal. |
| Sulfate | 0.30–0.55 oz./gal. |
| Active Fluoride | 0.2–0.4 oz./gal. |
| Selenium | 0.0065–0.0020 oz./gal. |
| Bath Temperature | 100°–130°F. | and a current density range of 1.0 – 2.0 a.s.i. for applying the second layer. Current density for applying the first layer is maintained in the range of 3.0 – 5.0 a.s.i.

After the first and second layers have been applied (by either of the above described methods), the outer surface of the second layer is etched. Etching may be accomplished either chemically or electrochemically. The preferred method is electrochemical etching. The plated rings after bring rinsed are placed in an aqueous solution of chromic acid (25 – 45 ounces per gallon) at a temperature of 90° – 130°F. At this particular bath temperature the reverse plating current density is 0.5 – 3.0 a.s.i. The reverse current is applied only sufficiently long to remove material at the interfaces (i.e. along the microcracks) without substantially affecting the thickness of the second layer. Because of the fine grain structure and microcrack pattern of the second layer, the etched surface of the second layer is finely porous and friable.

Unlapped rings plated in accordance with the above described method have been subjected to engine testing and to comparison testing with lapped rings plated only with hard chromium. Unlapped rings plated in accordance with the above method which show clear light (i.e. bypass light when placed in an engine cylinder) before engine testing establish light tightness in less than one hour and continuous contact with the cylinder wall within the first 2-½ hours of engine operation.

Further, comparison engine testing with lapped rings plated with hard chromium has shown that rings formed in accordance with this invention wear at selective high points, without scratching the cylinder or scuffing, and conform faster to the cylinder wall. Such engine tests indicate that the piston rings of this invention, after the initial "wear-in," wear at a rate equivalent to conventional hard chromium plated rings.

Figure 3:
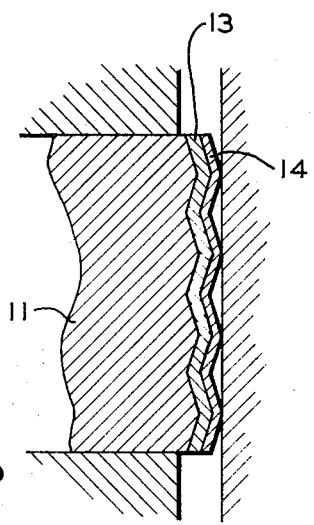
FIG. 3 is a sectional view of the plated piston ring, taken along the line 3—3 of FIG. 1, showing the piston ring within the groove of a piston and against a cylinder wall.
Figure 4:
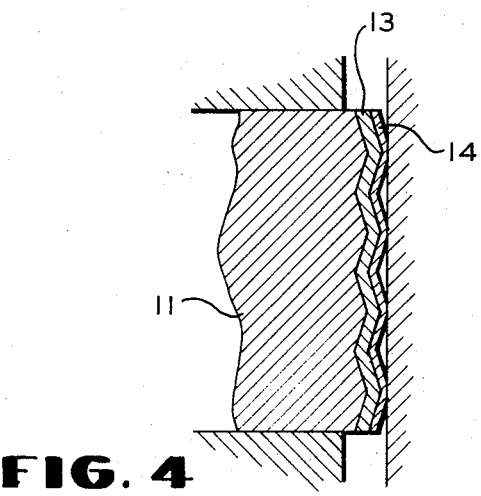
FIG. 4 is a view similar to FIG. 3 showing progressive wear of the piston ring bearing surface.
Figure 5:
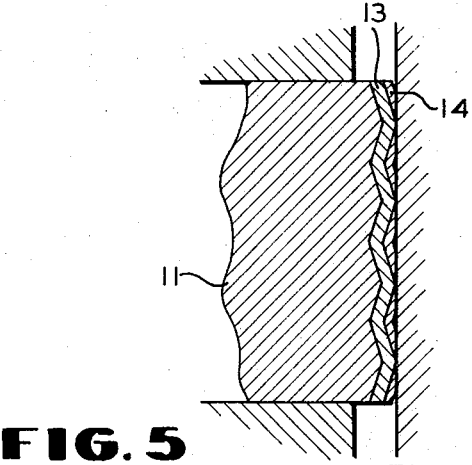
FIG. 5 is a view similar to FIG. 3 showing still further wear of the bearing surface of the piston ring.

As is illustrated in FIGS. 3–5, initial contact between the ring and the cylinder wall is only with the microcracked or second layer 14 which functions to cover up irregularities in the surface of the first layer 13 and provides a surface that is substantially as hard, but faster wearing than conventional hard chromium plate. As break-in of the ring occurs, the first layer wears away selectively at the high points until at points the hard chromium first layer becomes exposed. At this point, as shown in FIG. 5, the rings continue to wear at the normal rate.

It has been found that the finely porous surface of the second layer is oil wetable or retains a film of oil. This is a desirable condition for start-up conditions in that it provides initial scuff resistance. Also, it has been unexpectedly found that whereas hard chromium plate cracks under load due to its extreme brittleness and lack of ductility, it has been found that the microcracked chromium plate shows no evidence of further cracking under load. It is believed that in hard chromium plate there is a physical contraction of the coating during plating, whereas in plating microcracked chromium similar contraction does not occur. As a result micro-cracked chromium has more ability to expand and contract upon heating and greater ability to adjust to strain, such as elastically by mass movement of the individual microcrack particles.

Having described my invention, I claim:

1. A sealing ring comprising an annular metallic substrate, a first layer on the circumference of said substrate, said first layer comprising hard chromium, and a second layer on said first layer, said second layer comprising microcracked chromium having an etched outer surface and each of said layers having a Vicker's hardness in excess of 775.

2. The sealing ring of claim 1, wherein said first layer comprises electrodeposited hard chromium plate.

3. The sealing ring of claim 1, wherein said second layer comprises electrodeposited microcracked chromium plate having an electrochemically etched outer surface.

4. A piston ring comprising a split metallic ring, a first layer on the circumference of said ring, said first layer comprising hard chromium plate, and a second layer on said first layer, said second layer comprising microcracked chromium plate having an etched outer surface and each of said layers having a Vicker's hardness in excess of 775.

5. The piston ring of claim 4, where said first layer has a radial thickness of 0.0025 inch to 0.0060 inch and said second layer has a radial thickness of 0.0002 to 0.0010 inch.

6. A piston ring comprising a split metallic ring having a tool formed outer periphery, a first layer of hard chromium electrodeposited on said outer periphery, and a second layer of microcracked chromium electrodeposited on said first layer, said second layer having an electrochemically etched outer surface and each of said layers having a Vicker's hardness in excess of 775.

7. The piston ring of claim 6, wherein said first layer has a radial thickness in excess of 0.0025 inch.

8. The piston ring of claim 6, wherein said second layer has a radial thickness not in excess of 0.001 inch.

* * * * *